US012711094B2

(12) United States Patent
Jin et al.

(10) Patent No.: US 12,711,094 B2
(45) Date of Patent: Aug. 18, 2026

(54) ELECTRONIC DEVICE INCLUDING A PLURALITY OF CHIPLETS AND METHOD FOR TRANSMITTING TRANSACTION THEREOF

(71) Applicant: REBELLIONS INC., Seongnam-si (KR)

(72) Inventors: Young-Jae Jin, Seongnam-si (KR); Chang-Hyo Yu, Seongnam-si (KR)

(73) Assignee: REBELLIONS INC., Seongnam-si (KR)

(*) Notice: Subject to any disclaimer, the term of this patent is extended or adjusted under 35 U.S.C. 154(b) by 0 days.

(21) Appl. No.: 18/807,835

(22) Filed: Aug. 16, 2024

(65) Prior Publication Data

US 2025/0077467 A1 Mar. 6, 2025

(30) Foreign Application Priority Data

Aug. 30, 2023 (KR) ........................ 10-2023-0114968
Dec. 4, 2023 (KR) ........................ 10-2023-0173828
Jan. 31, 2024 (KR) ........................ 10-2024-0015311

(51) Int. Cl.
*G06F 15/173* (2006.01)
*G06F 13/16* (2006.01)
*G06F 13/28* (2006.01)
*G06F 13/38* (2006.01)

(52) U.S. Cl.
CPC ...... *G06F 15/17343* (2013.01); *G06F 13/161* (2013.01); *G06F 13/28* (2013.01); *G06F 13/38* (2013.01); *G06F 15/17312* (2013.01)

(58) Field of Classification Search
None
See application file for complete search history.

(56) References Cited

U.S. PATENT DOCUMENTS 12,204,482 B1* 1/2025 Farjadrad ................ C01B 3/382
2012/0191967 A1* 7/2012 Lin ......................... G06F 17/16 713/100
2015/0106778 A1* 4/2015 Mangano ............ G06F 13/4068 716/130
2019/0213150 A1* 7/2019 Ben-Chen ............... G06F 13/20
2019/0227753 A1* 7/2019 Zhu ..................... G06F 13/1668
2020/0192839 A1* 6/2020 Noyes ................. G06F 13/4027
2021/0279200 A1* 9/2021 Zitlaw ................... G06F 13/161
2021/0311897 A1* 10/2021 Malladi ............... G06F 12/0802
2021/0311900 A1* 10/2021 Malladi ............... G06F 13/4027
2021/0326277 A1* 10/2021 Kee ......................... G06F 13/26
2021/0373867 A1* 12/2021 Chen .......................... G06F 8/41
2022/0121584 A1* 4/2022 Brewer ................. G06F 13/161
2022/0198117 A1* 6/2022 Raumann .............. G06F 9/5011
2022/0318111 A1* 10/2022 Choudhary ......... G06F 13/4221
2022/0327083 A1* 10/2022 Das Sharma ........... H01L 25/18
(Continued)

*Primary Examiner* — Henry Tsai
*Assistant Examiner* — Christopher A Bartels
(74) *Attorney, Agent, or Firm* — BROADVIEW IP LAW, PC

(57) ABSTRACT

An electronic device comprising a plurality of chiplets is disclosed. The electronic device comprises a first chiplet that generates a transaction, a second chiplet that receives the transaction, and at least one third chiplet that relays the transaction, wherein the first chiplet determines a route path for the transaction that passes through the at least one third chiplet, and transmits the transaction through the determined route path for the transaction.

16 Claims, 14 Drawing Sheets

(56) References Cited

U.S. PATENT DOCUMENTS

2022/0334995 A1* 10/2022 Das Sharma ....... G06F 13/4273
2022/0342840 A1* 10/2022 Das Sharma ....... G06F 13/4221
2023/0027585 A1 1/2023 Weng et al.
2023/0059948 A1* 2/2023 Wang ....................... G06N 7/01
2023/0114271 A1* 4/2023 Pappu ................. G06F 11/1004
710/113
2023/0236995 A1* 7/2023 Jayaraman .......... G06F 12/0813
710/308
2023/0363182 A1* 11/2023 Lin ..................... H01L 23/5383
2023/0385222 A1* 11/2023 Ma ...................... G06F 13/4068
2024/0037056 A1* 2/2024 Shimizu .................. G06F 13/38
2024/0311330 A1* 9/2024 Das Sharma ....... G06F 13/4295
2024/0394216 A1* 11/2024 Ansari ................ G06F 15/7821
2025/0245175 A1* 7/2025 Jin ...................... G06F 13/1673
2025/0265219 A1* 8/2025 Bavishi ............... G06F 13/4291

* cited by examiner

| TIME | FIRST ROUTE PATH | SECOND ROUTE PATH |
|---|---|---|
| T0 | 10 | 10 |
| T1 | 8 | 10 |
| T2 | 9 | 10 |
| T3 | 12 | 10 |
| T4 | 12 | 12 |

FIG. 5

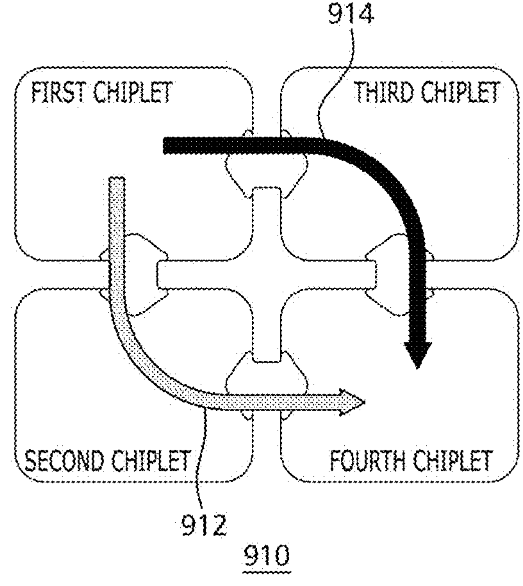
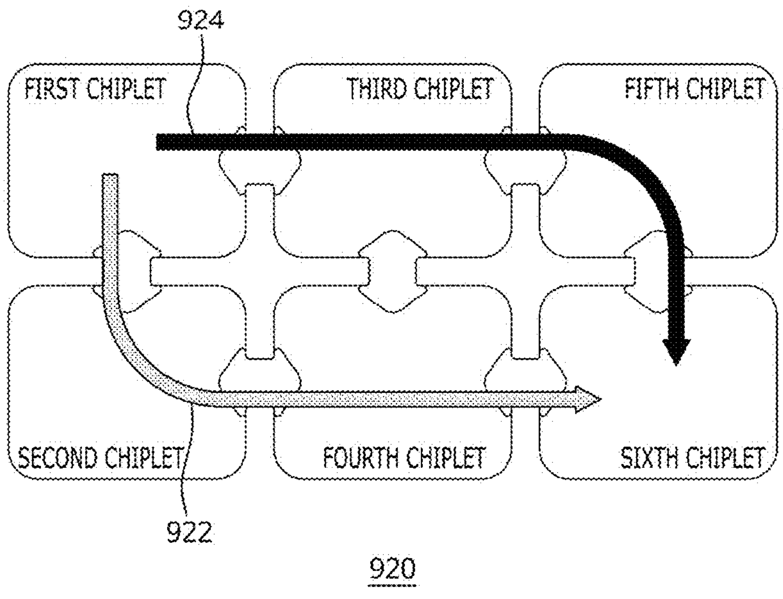
FIG. 9

| | SOURCE CHIPLET | ADDRESS | RELAY CHIPLET | DESTINATION CHIPLET |
|---|---|---|---|---|
| | FIRST CHIPLET | 0x000 | - | FIRST CHIPLET |
| | FIRST CHIPLET | 0x001 | - | SECOND CHIPLET |
| | FIRST CHIPLET | 0x010 | - | THIRD CHIPLET |
| 1210 | FIRST CHIPLET | 0x011 | SECOND CHIPLET | FOURTH CHIPLET |
| 1220 | FIRST CHIPLET | 0x100 | THIRD CHIPLET | FOURTH CHIPLET |
| | SECOND CHIPLET | 0x000 | - | FIRST CHIPLET |
| | SECOND CHIPLET | 0x001 | - | SECOND CHIPLET |
| | SECOND CHIPLET | 0x010 | FOURTH CHIPLET | THIRD CHIPLET |
| | SECOND CHIPLET | 0x011 | - | FOURTH CHIPLET |
| | SECOND CHIPLET | 0x100 | FIRST CHIPLET | THIRD CHIPLET |
| | THIRD CHIPLET | 0x000 | - | FIRST CHIPLET |
| | THIRD CHIPLET | 0x001 | FIRST CHIPLET | SECOND CHIPLET |
| | THIRD CHIPLET | 0x010 | - | THIRD CHIPLET |
| | THIRD CHIPLET | 0x011 | - | FOURTH CHIPLET |
| | THIRD CHIPLET | 0x100 | FOURTH CHIPLET | SECOND CHIPLET |
| | FOURTH CHIPLET | 0x000 | THIRD CHIPLET | FIRST CHIPLET |
| | FOURTH CHIPLET | 0x001 | - | SECOND CHIPLET |
| | FOURTH CHIPLET | 0x010 | - | THIRD CHIPLET |
| | FOURTH CHIPLET | 0x011 | - | FOURTH CHIPLET |
| | FOURTH CHIPLET | 0x100 | SECOND CHIPLET | FIRST CHIPLET |

FIG. 12

ELECTRONIC DEVICE INCLUDING A PLURALITY OF CHIPLETS AND METHOD FOR TRANSMITTING TRANSACTION THEREOF

CROSS-REFERENCE TO RELATED APPLICATIONS

This application claims priority to Korean Patent Application No. 10-2023-0114968, filed in the Korean Intellectual Property Office on Aug. 30, 2023, Korean Patent Application No. 10-2023-0173828, filed in the Korean Intellectual Property Office on Dec. 4, 2023, and Korean Patent Application No. 10-2024-0015311, filed in the Korean Intellectual Property Office on Jan. 31, 2024, the entire contents of which are hereby incorporated by reference.

BACKGROUND

Field

The present disclosure relates to an electronic device including a plurality of chiplets and a method for transmitting transaction thereof.

Description of Related Art

As the demand for high performance and miniaturization of semiconductor devices and electronic products using the semiconductor devices increases, various package technologies related to semiconductor devices are being developed. In recent years, along with the development of these technologies, packaging technologies using chiplets have emerged.

Chiplet system may refer to a system that is provided by, rather than configuring chips performing various functions on one die (or substrate), dividing the chips in units of functionalities, configuring the divided chips on each of a plurality of dies (chiplet), and packaging them into one system. In other words, the chiplet system was developed to overcome the limitations of existing monolithic chips, and the dies in the package may be connected to each other through a silicon interposer and communicate with each other according to a die-to-die communication standard such as universal chiplet interconnect express (UCIe).

Meanwhile, when transmitting a transaction between non-adjacent chiplets of a plurality of chiplets configured in the chiplet system, at least one chiplet may relay the transaction. As such, when transmitting a transaction via at least one chiplet, a congestion situation of the transaction may occur depending on the performance of the chiplet in the route, the state of communication between chiplets, etc., which may consequently affect the transaction processing performance. As a result, there is a need to develop technologies to alleviate the congestion of the transaction when the transaction is transmitted.

SUMMARY

In order to solve one or more problems (e.g., the problems described above and/or other problems not explicitly described herein), the present disclosure provides an electronic device including a plurality of chiplets and a method for transmitting transaction thereof.

The present disclosure may be implemented in a variety of ways, including a method, an apparatus (system), or a non-transitory computer-readable recording medium storing instructions.

According to an aspect of the present disclosure, an electronic device comprising a plurality of chiplets may comprise a first chiplet that generates a transaction, a second chiplet that receives the transaction and at least one third chiplet that relays the transaction, wherein the first chiplet may determine a route path for the transaction that passes through the at least one third chiplet and may transmit the transaction through the determined route path for the transaction.

According to an aspect of the present disclosure, the at least one third chiplet may include a chiplet (3-1) connected to the first chiplet through a first communication module in a first direction of the first chiplet, and a chiplet (3-2) connected to the first chiplet through a second communication module in a second direction of the first chiplet, and the route path for the transaction may include a first route path that passes through the chiplet (3-1) and a second route path that passes through the chiplet (3-2).

According to an aspect of the present disclosure, the first chiplet may determine the route path for the transaction based on a number of transactions associated with the first route path and a number of transactions associated with the second route path.

According to an aspect of the present disclosure, the number of transactions associated with the first route path may correspond to a number of multiple outstandings (MOs) of a first port associated with the first communication module, and the number of transactions associated with the second route path may correspond to a number of MOs of a second port associated with the second communication module.

According to an aspect of the present disclosure, the first chiplet may include a first function module that generates an instruction associated with the transmission of the transaction or controls the transmission of the transaction based on a received instruction, and the first function module may be configured to determine the route path for the transaction based on the number and size of the transactions associated with the first route path and the number and size of the transactions associated with the second route path.

According to an aspect of the present disclosure, the first chiplet may further include a second function module that generates the transaction, the first function module may be an upper level module of the second function module, the first function module may determine the route path for the transaction in consideration of an expected transaction congestion situation, and the first function module may modify the route path for the transaction generated by the second function module according to the determined route path for the transaction.

According to an aspect of the present disclosure, the first chiplet may include a monitoring module that detects a congestion state of at least one of a first interface for data transmission between the plurality of chiplets, or a second interface for data transmission in the second chiplet, the chiplet (3-1), and the chiplet (3-2), and the monitoring module may be configured to determine the route path for the transaction based on the congestion state of at least one of the first interface or the second interface.

According to an aspect of the present disclosure, the monitoring module may be connected to the second chiplet, the chiplet (3-1), and the chiplet (3-2), and the monitoring module may receive at least one of congestion information associated with the first interface or congestion information associated with the second interface from each of the second chiplet, the chiplet (3-1), and the chiplet (3-2).

According to an aspect of the present disclosure, the monitoring module may receive at least one of congestion information associated with the first interface or congestion information associated with the second interface, from another chiplet through a third interface different from the first interface.

According to an aspect of the present disclosure, the first chiplet may include, in the transaction, information on the determined route path for the transaction.

According to an aspect of the present disclosure, the information on the determined route path for the transaction may include information on a preferred direction between the first direction or the second direction.

According to an aspect of the present disclosure, the information on the determined route path for the transaction may further include information on a number of relay chiplets in the preferred direction.

According to an aspect of the present disclosure, the information on the determined route path for the transaction may include an encoding code associated with one of a plurality of route paths that can be set between the plurality of chiplets.

According to an aspect of the present disclosure, a method for transmitting a transaction of an electronic device including a plurality of chiplets, the method may comprise generating, by a first chiplet, a transaction, determining, by the first chiplet, a route path for the transaction that passes through at least one third chiplet, transmitting, by the first chiplet, the transaction to a second chiplet through the determined route path for the transaction, and receiving, by the second chiplet, the transaction.

According to an aspect of the present disclosure, the at least one third chiplet may include a chiplet (3-1) connected to the first chiplet through a first communication module in a first direction of the first chiplet, and a chiplet (3-2) connected to the first chiplet through a second communication module in a second direction of the first chiplet, and the route path for the transaction may include a first route path that passes through the chiplet (3-1) and a second route path that passes through the chiplet (3-2).

According to an aspect of the present disclosure, the determining the route path for the transaction may include determining the route path for the transaction based on a number of transactions associated with the first route path and a number of transactions associated with the second route path.

According to an aspect of the present disclosure, the first chiplet may include a function module that generates an instruction associated with the transmission of the transaction or controls the transmission of the transaction based on a received instruction, and the determining the route path for the transaction may include determining, by the function module, the route path for the transaction based on the number and size of transactions associated with the first route path and the number and size of transactions associated with the second route path.

According to an aspect of the present disclosure, the first chiplet may include a monitoring module that detects a congestion state of at least one of a first interface for data transmission between the plurality of chiplets, or a second interface for data transmission in the second chiplet, the chiplet (3-1), and the chiplet (3-2), and the determining the route path for the transaction may include determining, by the monitoring module, the route path for the transaction based on the congestion state of at least one of the first interface or the second interface.

According to an aspect of the present disclosure, the method may further comprise including, in the transaction, information on the determined route path for the transaction.

According to an aspect of the present disclosure, the information on the determined route path for the transaction may include information on a preferred direction between the first direction or the second direction.

According to some aspects of the present disclosure, when transmitting a transaction between non-adjacent chiplets, a route path that can minimize the congestion situation of the transaction can be determined, improving the processing performance of the transaction.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 5 is a diagram provided to explain an example of determining a route path for a transaction based on the number of transactions allocated to a port associated with a communication module;

FIG. 9 is a diagram provided to explain an example of transmitting a transaction based on the information on the preferred direction;

FIG. 12 is a diagram provided to explain a method of including, in a transaction, an encoding code associated with a route path for a transaction;

DETAILED DESCRIPTION

Figure 1:
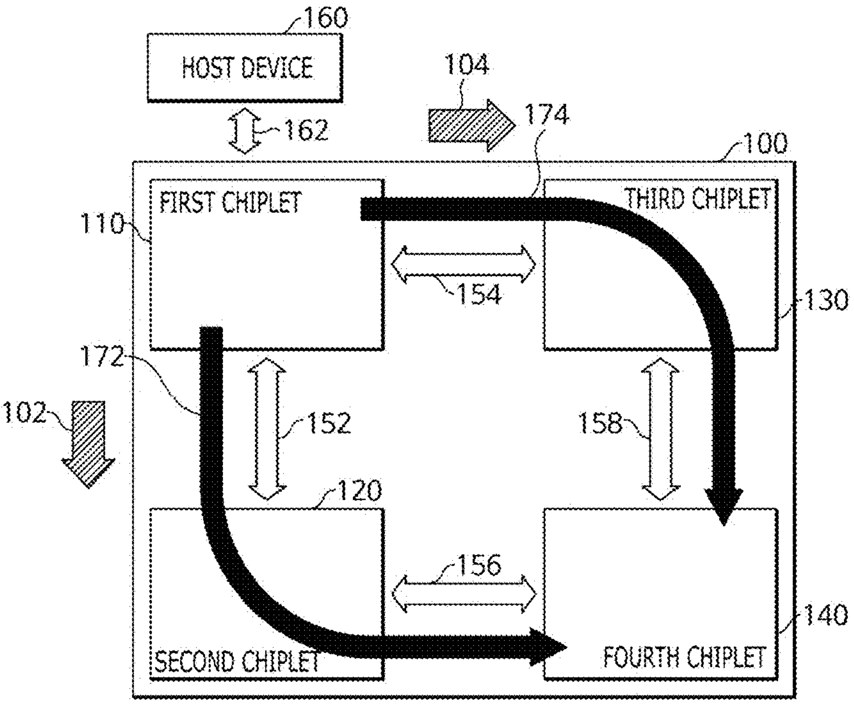
FIG. 1 is a diagram provided to explain a configuration of an electronic device including a plurality of chiplets.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Accordingly, the terms used in this disclosure should be defined based on the meaning of the term and the overall content of the present disclosure, rather than simply the name of the term.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as circuit and circuitry may refer to circuits in hardware, but may also refer to circuits in software. The "processor" should be interpreted broadly to encompass a general-purpose processor, a central processing unit (CPU), a microprocessor, a digital signal processor (DSP), a neural processing unit (NPU), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, "each of a plurality of A" may refer to each of all components included in the plurality of A, or may refer to each of some of the components included in a plurality of A.

In the present disclosure, a "chiplet" is an integrated circuit (IC) block and may be a type of semiconductor device that may be coupled, connected, or combined with other chiplets to form one package.

In the present disclosure, a "source node" may refer to a chiplet or a part of a chiplet from which transmission of specific information or data (e.g., transaction) starts.

In the present disclosure, a "relay node" may refer to a chiplet or a part of a chiplet that receives information or data from a source node or other relay node and transmits the information to another relay node or a destination node, and the "destination node" may refer to a chiplet or a part of a chiplet that receives information or data from a source node or relay node and processes the same.

The dies in the chiplet system may be connected to each other by wire bonding, through silicon via (TSV), hybrid bonding, etc. For example, the dies in the chiplet system may be connected to each other through a silicon interposer and communicate with each other according to a die-to-die communication standard such as universal chiplet interconnect express (UCIe). For example, congestion state information of a die-to-die interface associated with each chiplet, congestion state information of a bus system, etc. may be transmitted through the silicon interposer. Alternatively, the dies in the chiplet system may communicate via interfaces such as Serial Peripheral Interface (SPI), Inter-Integrated Circuit (I2C), Universal Asynchronous Receiver/Transmitter (UART), Universal Synchronous Receiver/Transmitter (USART), Controller Area Network (CAN), Local Interconnect Network (LIN), Mobile Industry Processor Interface (MIPI), Synchronous Serial Interface (SSI), Peripheral Component Interconnect express (PCIe), etc.

Hereinafter, various examples of the present disclosure will be described in detail with reference to the accompanying drawings.

FIG. 1 is a diagram provided to explain a configuration of an electronic device 100 including a plurality of chiplets. Referring to FIG. 1, the electronic device 100 may include a plurality of chiplets. For example, the electronic device 100 may include a first chiplet 110, a second chiplet 120, a third chiplet 130, and a fourth chiplet 140. However, the number of chiplets included in the electronic device 100 is not limited to the above. According to various aspects, the electronic device 100 may omit at least one of the chiplets described above, and may further include at least one more additional chiplet.

The plurality of chiplets may be connected to each other through first interfaces 152, 154, 156, and 158. For example, the first chiplet 110 and the second chiplet 120 may be connected through a 1-1 interface 152, the first chiplet 110 and the third chiplet 130 may be connected through a 1-2 interface 154, the second chiplet 120 and the fourth chiplet 140 may be connected through a 1-3 interface 156, and the third chiplet 130 and the fourth chiplet 140 may be connected through a 1-4 interface 158. The first interfaces 152, 154, 156, and 158 may refer to a die-to-die interface, and may include, for example, a universal chiplet interconnect express (UCIe) interface, etc.

Any one (e.g., the first chiplet 110) of the plurality of chiplets may be connected to an external device (e.g., a host device 160) through a second interface 162. For example, the second interface 162 may refer to a host interface, and may include, for example, a peripheral component interconnect express (PCIe), etc.

A plurality of chiplets may be connected to each other through a third interface (not illustrated).

The third interface may have a lower transmission rate than the first interfaces 152, 154, 156, and 158, but a higher stability. For example, the third interface may include an interface such as SPI, I2C, UART, USART, CAN, LIN, MIPI, SSI, PCIe, etc. The third interface may be implemented using a silicon interposer, and congestion state information of the die-to-die interface associated with each chiplet, congestion state information of a bus system, etc. may be transmitted through the silicon interposer.

When transmitting a transaction between non-adjacent chiplets of a plurality of chiplets, at least one chiplet may relay the transaction. For example, referring to FIG. 1, when transmitting a transaction between the first chiplet 110 and the fourth chiplet 140, the second chiplet 120 and/or the third chiplet 130 may relay the transaction. When the chiplets are adjacent to each other, it may indicate a state in which no other chiplets are disposed between the chiplets arranged in a designated direction (e.g., in a first direction 102 or a second direction 104) and the chiplets are directly connected to each other. For example, referring to FIG. 1, the second chiplet 120 disposed adjacent to the first chiplet 110 in the first direction 102 (e.g., in the longitudinal direction) and directly connected to the first chiplet 110, and the third chiplet 130 disposed adjacent to the first chiplet 110 in the second direction 104 (e.g., in the horizontal direction) and connected directly to the first chiplet 110 may be the chiplets adjacent to the first chiplet 110. In this case, the fourth chiplet 140 disposed in a third direction (e.g., in a diagonal direction) other than the first direction 102 or the second direction 104 and not directly connected (that is, indirectly connected) to the first chiplet 110 may not be a chiplet adjacent to the first chiplet 110. In the following description, a chiplet (e.g., the first chiplet 110) that transmits a transaction may be referred to as a source chiplet, a master chiplet, a source node, etc. In addition, a chiplet (e.g., the fourth chiplet 140) that receives the transaction may be referred to as a destination chiplet, a slave chiplet, a destination node, etc. Additionally, a chiplet (e.g., the second chiplet 120 and/or the third chiplet 130) that relays the transaction may be referred to as a relay chiplet, a relay node, or an intermediate node.

In the present disclosure, for convenience of explanation, it is described that a transaction is transmitted and received between the chiplets, but this may include transmitting and receiving a transaction between IP (Intellective Property) blocks disposed in each of the chiplets. For example, transmitting a transaction from a source chiplet to a destination chiplet may indicate transmitting the transaction from an IP block of the source chiplet (hereinafter referred to as a master IP) to an IP block of the destination chiplet (hereinafter referred to as a slave IP). The IP block may refer to a reusable logic, cell, and/or a function module of an integrated circuit layout design unit. The IP block may be designed to perform a specific function, and complex multifunctional systems on chips (SoCs) may be implemented through a combination of functions. For example, the IP block may include a processor core, a memory block, a digital signal processor, a peripheral device interface, a graphics device, an analog block, a communication block, a security block, a power management device, etc.

The source chiplet (e.g., the first chiplet 110) may generate a transaction. In addition, the source chiplet may transmit the transaction to the destination chiplet (e.g., the fourth chiplet 140) through at least one relay chiplet (e.g., the second chiplet 120 and/or the third chiplet 130). For example, the source chiplet may determine a route path for the transaction, which may go through at least one relay chiplet, and transmit the transaction to the destination chiplet through the determined route path for the transaction. For example, referring to FIG. 1, the route path for the transaction may include a first route path 172 via the second chiplet 120, and a second route path 174 via the third chiplet 130.

The source chiplet may determine the route path for the transaction based on the number of transactions associated with each of a plurality of configurable route paths. The plurality of configurable route paths may refer to paths connectable from the source chiplet to the destination chiplet. For example, referring to FIG. 1, the plurality of configurable route paths may include the first route path 172 that starts from the first chiplet 110, goes through the second chiplet 120, and is connected to the fourth chiplet 140, and the second route path 174 that starts from the first chiplet 110, goes through the third chiplet 130, and is connected to the fourth chiplet 140. For example, the source chiplet may determine the route path for the transaction based on the number of transactions associated with the first route path 172 and the number of transactions associated with the second route path 174. The number of transactions associated with the first route path 172 may correspond to the number of multiple outstandings (MO) of a first port associated with the first communication module of the first chiplet 110 for connection with the second chiplet 120. In addition, the number of transactions associated with the second route path 174 may correspond to the number of MOs of a second port associated with the second communication module of the first chiplet 110 for connection with the third chiplet 130.

In more detail, each port of the master IP may be set with the number of MOs limiting how many transactions to be exported to the bus system. In this case, the current number of MOs may be increased according to the number of request transactions, and the current number of MOs may be decreased when the response transaction returns. For example, the number of MOs may increase when a transaction is transmitted, and decrease when a response to the transaction is received. The master IP may count the number of MOs for each of a plurality of configurable route paths, and determine a route path having a small current number of MOs as a route path for the transaction. To this end, the master IP may determine the route path for the transaction while managing the number of MOs at the port level. This method may be referred to as an IP port level information based route path decision method. However, the number of transactions associated with the route path is not limited to corresponding to the number of MOs of ports associated with the communication module. According to some aspects, the number of transactions associated with the route path may correspond to the route path itself, that is, to the number of transactions actually transmitted through the route path. According to another aspect, the number of transactions associated with the route path may correspond to the number of transactions that pass through a specific relay chiplet, for example, the number of transactions that pass through a relay chiplet with a processing rate of the transaction less than a threshold. In some aspects, information on how many responses are transmitted from the slave IP to the master IP and over which path may be utilized. For example, if a route path for the transaction is set and the transaction is transmitted along the set route path, a response to the transaction (or a response transaction) may be transmitted in the reverse direction of the route path for the transaction. In this case, the number of transactions associated with the route path may correspond to the number of response transactions.

The source chiplet may determine, through a function module that generates an instruction associated with the transmission of a transaction or controls the transmission of a transaction based on a received instruction, the route path for the transaction based on the number and size of transactions associated with each of the plurality of configurable route paths. For example, referring to FIG. 1, the function module may determine the route path for the transaction based on the number and size of transactions associated with the first route path 172 and the number and size of transactions associated with the second route path 174. Hereinafter, a function module that generates an instruction associated with the transmission of a transaction or controls the transmission of a transaction based on a received instruction is referred to as a first function module.

To described this in more detail, the master IP may receive an instruction for determining an operation of the master IP from the host of the chiplet, e.g., from an external host (e.g., the host device 160) connected to the chiplet including the master IP or a host in the chiplet, e.g., an IP (e.g., CPU, processor, etc.) that is a host inside the chiplet including the master IP, and perform the corresponding operation. Some or all of the operations of the master IP may include an operation of generating a transaction and transmitting the transaction to a destination chiplet, that is, to a slave IP. In addition, instructions may be generated by a compiler, and the host IP may receive the generated instructions and modify the received instructions appropriately to suit the situation of the hardware and operate the same. In this process, the operation of modifying the instruction may be performed by a program previously input to the host IP. Because the compiler that generates the instruction, or the program previously input to the host IP that modifies the received instruction is software, the first function module may determine a route path for the transaction in the transaction generation stage based on the software. This method may be referred to as a software based route path decision method.

When the function module for generating a transaction in the source chiplet is referred to as a second function module, the first function module may be an upper level module of the second function module. For example, the host IP may be an upper level module of the master IP, and the host IP as the upper level module may monitor the transactions being performed. In this case, the first function module may determine the route path for the transaction in consideration of the expected transaction congestion situation. In addition, the first function module may modify the route path for the transaction generated by the second function module according to the determined route path for the transaction. The first function module (e.g., host IP) may know in advance the number of transactions and the size of each of the transactions, and may determine (and modify) the route path for the transaction such that the transactions can be appropriately distributed to each of a plurality of configurable route paths. For example, if the number of transactions transmitted from the master IP to the slave IP is n (e.g., 100) and all have the same size, the first function module may determine the route path for the half (n/2) of the transactions is the first route path 172 (or the second route path 174), and determine the route path for the other half of the transactions is the second route path 174 (or the first route path 172). As another example, if the number of transactions transmitted from the master IP to the slave IP is n (e.g., 100), and at least some have different sizes, the first function module may identify the number of transactions with the same total size. That is, if the total size of the first number of transactions (e.g., transactions 1 to 60) of n transactions and the total size of the second number of transactions (e.g., transactions 61 to 100) are the same as each other, the first function module may determine the route path for the first number of transactions is the first route path 172 (or the second route path 174), and determine the route path for the second number of transactions is the second route path 174 (or the first route path 172).

The source chiplet may determine, through a monitoring module that detects the congestion state of the interface for data transmission, the route path for the transaction based on the congestion state of the interface. For example, referring to FIG. 1, the monitoring module may determine the route path for the transaction based on the congestion state of at least one of the first interfaces 152, 154, 156, and 158 for data transmission between a plurality of chiplets or the second interface for data transmission in a plurality of chiplets. The method may be referred to as a relay and destination node system congestion monitor based route path decision method.

In more detail, the congestion state of the interface for data transmission, e.g., the congestion state of the die-to-die interface and/or the bus interface may be continuously updated (or monitored). The monitoring module for detecting the congestion state of the interface for data transmission may be present in each chiplet, or may be present in only one chiplet (e.g., only in the first chiplet 110). The monitoring module may be connected to the destination chiplet and the relay chiplet and receive congestion information associated with the interface for data transmission from each of the connected chiplets. For example, the monitoring module in the first chiplet 110 may be connected to the second chiplet 120, the third chiplet 130, and the fourth chiplet 140, and receive at least one of congestion information associated with the first interfaces 152, 154, 156, and 158 or congestion information associated with the bus interface from each of the second chiplet 120, the third chiplet 130, and the fourth chiplet 140. The monitoring module may determine the route path for the transaction such that the transaction is transmitted through an interface with low congestion, based on the congestion information associated with the interface for data transmission. The monitoring module may receive the congestion information associated with the interface for data transmission from another chiplet through an interface different from the first interfaces 152, 154, 156, and 158.

The source chiplet may include, in the transaction, information on the determined route path for the transaction. For example, the source chiplet may set, in the transaction, the determined route path for the transaction. As described above, when the route path is set in the transaction, the route path may be set in units of transactions, which may enable runtime dynamic route path setting.

The information on the route path for the transaction may include information on a preferred direction among the directions in which the relay chiplets are positioned. For example, referring to FIG. 1, the information on the route path for the transaction may include information on a preferred direction between the first direction 102 and the second direction 104. The "preferred" as used herein may mean that it is a path in which a transaction is routed preferentially during transmission. For example, if the first direction 102 is the preferred direction, the transaction may be transmitted in the first direction 102 to the end and then transmitted in the second direction 104, and if the second direction 104 is the preferred direction, the transaction may be transmitted in the second direction 104 to the end and then transmitted in the first direction 102. If the preferred direction is the first direction 102, it may be a "vertical-to-the-end" method, and if the preferred direction is the second direction 104, it may be a "horizontal-to-the-end" method. The information on the preferred direction may be allocated to a specific bit in the transaction. For example, the source chiplet may set a vertical flag or a horizontal flag in a part of address bit, user bit, or control bit of the transaction. As described above, if the flag bit is set, an entity transmitting the transaction (e.g., the routing unit or bus system of the first chiplet 110) may check the flag bit set in the transaction and transmit the transaction to the adjacent chiplet according to the checked flag bit. For example, if the vertical flag is set, the transaction may be transmitted to a chiplet in the vertical direction (e.g., in the first direction 102) and if the horizontal flag is set, the transaction may be transmitted to a chiplet in the horizontal direction (e.g., in the second direction 104).

The information on the route path for the transaction may include information on a preferred direction among the directions in which the relay chiplets are positioned, and information on the number of relay chiplets in the preferred direction. The "number of relay chiplets in the preferred direction" may refer to information on the number of chiplets to go through first in the preferred direction during a transmission of a transaction, and may be referred to as a hop counter. The vertical/horizontal flag and hop counter may be encoded by a subject that generates the transaction, a subject that determines the route path for the transaction, or both.

The information on the route path for the transaction may include an encoding code associated with one of a plurality of configurable route paths. For example, the route path for a transaction may be directly encoded in the transaction. In this case, the encoding code may be included in any bit in the transaction. For example, the encoding code may be included in an address bit of a transaction. As another example, the encoding bit may be included in a user bit of the transaction. In this case, it may be implementable by replacing a part of the address bit with the user bit.

Figure 2:
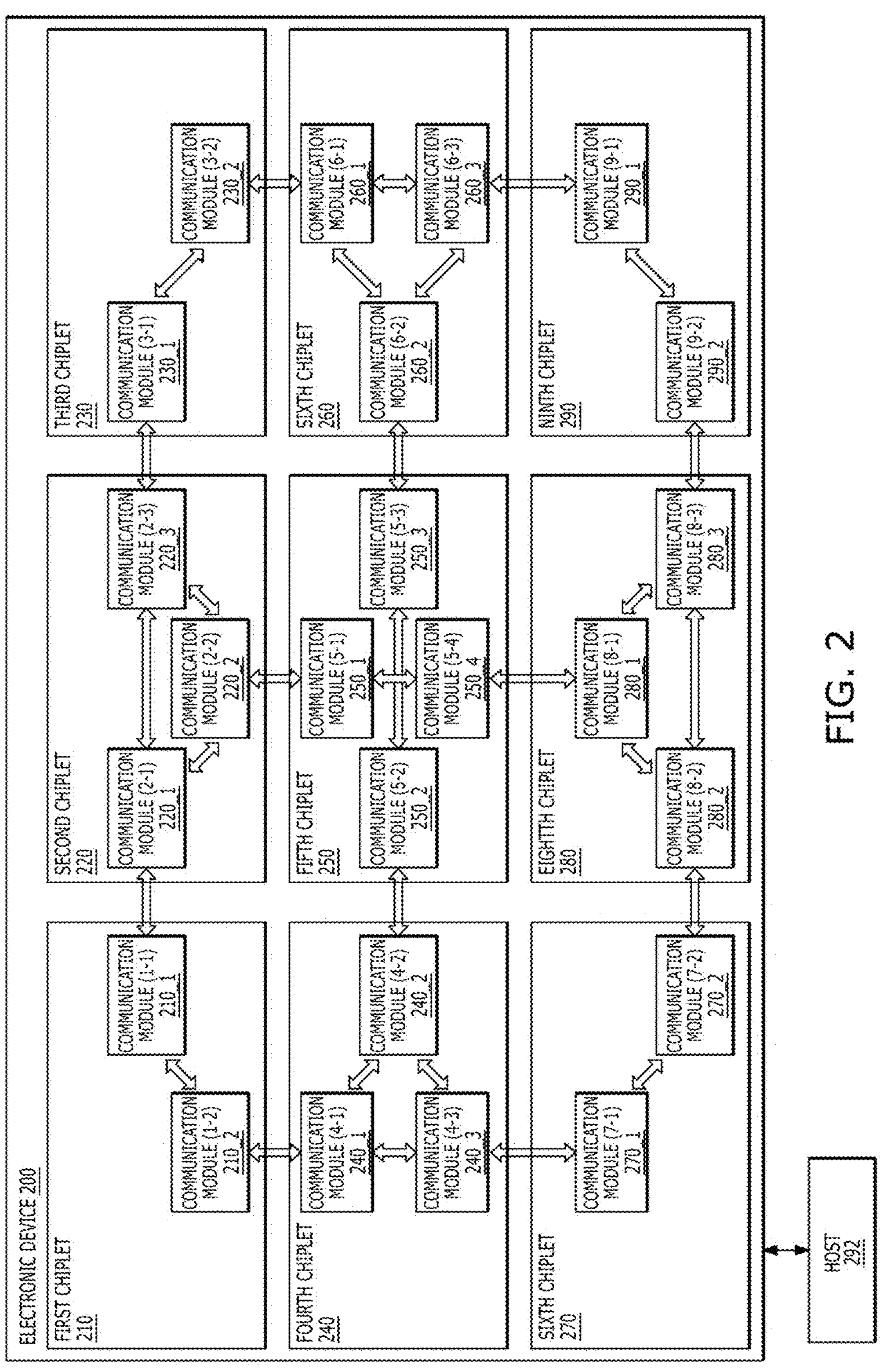
FIG. 2 is a diagram illustrating an example of an electronic device.

FIG. 2 is a diagram illustrating an example of an electronic device 200. Referring to FIG. 2, the electronic device 200 (e.g., the electronic device 100 of FIG. 1) may include a plurality of chiplets. For example, the electronic device 200 may include a first chiplet 210, a second chiplet 220, a third chiplet 230, a fourth chiplet 240, a fifth chiplet 250, a sixth chiplet 260, a seventh chiplet 270, an eighth chiplet 280, and a ninth chiplet 290. However, the number of chiplets included in the electronic device 200 is not limited to the above. According to various aspects, the electronic device 200 may omit at least one of the chiplets described above, and may further include at least one more additional chiplet. In addition, the arrangement of chiplets included in the electronic device 200 is not limited to those illustrated, and may be arranged in various other ways according to the purpose. The electronic device 200 including a plurality of chiplets may be packaged, and thus may be referred to as a package device or a chiplet system.

Each of the plurality of chiplets may include various components such as a processing core, a memory, an input and output interface, a power management circuit, a control logic, an analog-to-digital converter (ADC), and a digital-to-analog converter (DAC).

Each of the plurality of chiplets may include one or more communication modules. Each of the plurality of chiplets may include one or more communication modules capable of communicating with other chiplets adjacent to each of the plurality of chiplets. For example, the first chiplet 210 may include a communication module (1-1) 210_1 and a communication module (1-2) 210_2, and the second chiplet 220 may include a communication module (2-1) 220_1, a communication module (2-2) 220_2, and a communication module (2-3) 220_3. In addition, the fifth chiplet 250 may include a communication module (5-1) 250_1, a communication module (5-2) 250_2, a communication module (5-3) 250_3, and a communication module (5-4) 250_4. A chiplet including the same number of communication modules may be implemented in the same architecture. For example, the fourth chiplet 240 and the sixth chiplet 260 may be implemented in the same architecture, but connected to the other chiplets in different directions. For example, a communication module (4-1) 240_1 and a communication module (6-1) 260_1, a communication module (4-2) 240_2 and a communication module (6-2) 260_2, and a communication module (4-3) 240_3 and a communication module (6-3) 260_3 may correspond to each other.

Alternatively, each of the plurality of chiplets may include the same number of communication modules. For example, each of the plurality of chiplets included in the electronic device 200 as well as the fifth chiplet 250 may include four communication modules, and in FIG. 2, for convenience of explanation, a communication module in a direction without an adjacent chiplet may be omitted.

The communication module may include a controller and a PHY layer. The communication module may include a connection management module, a connection module, etc.

Each of the plurality of chiplets may be connected to each other through a communication module and a connection interface (indicated by arrows between communication modules of different chiplets in FIG. 2). For example, the fifth chiplet 250 and the eighth chiplet 280 may be connected to each other via the communication module (5-4) 250_4, a communication module (8-1) 280_1, and an interface. The connection interface between chiplets may refer to a die-to-die interface, and may include UCIe, etc., for example.

Each of the communication modules in the plurality of chiplets may be connected to each other through a bus interface (indicated by arrows between communication modules in one chiplet in FIG. 2). For example, a communication module (3-1) 230_1 and a communication module (3-2) 230_2 in the third chiplet 230 may be connected to each other through a bus interface. Likewise, a communication module (9-1) 290_1 and a communication module (9-2) 290_2 in the ninth chiplet 290 may be connected to each other through a bus interface. Additionally, aspects are not limited to the communication between communication modules, and components in each chiplet may communicate with other components through a bus interface, etc. The bus interface may be an advanced extensible interface (AXI) type interface. For example, each of the communication modules in the plurality of chiplets may be connected to each other through the AXI Master port and the AXI Slave port, and each of the AXI Master port and the AXI Slave port may include a read port and a write port.

Information may be transmitted and received in the electronic device 200 using the communication module, the connection interface, and/or the bus interface of each of the plurality of chiplets. For example, when information is transmitted from the fourth chiplet 240 to the ninth chiplet 290, the information may be transmitted to the ninth chiplet 290 in the order of the communication module (4-3) 240_3, a communication module (7-1) 270_1, a communication module (7-2) 270_2, a communication module (8-2) 280_2, a communication module (8-3) 280_3, and a communication module (9-2) 290_2. Alternatively, when information is transmitted from the fourth chiplet 240 to the ninth chiplet 290, the information may be transmitted to the ninth chiplet 290 in the order of the communication module (4-2) 240_2, the communication module (5-2) 250_2, the communication module (5-3) 250_3, the communication module (6-2) 260_2, the communication module (6-3) 260_3, and the communication module (9-1) 290_1. The path for routing the information from a specific chiplet to another chiplet may be determined by the architecture of the chiplet system or may be determined by various routing algorithms such as the Dijkstra algorithm, the Bellman-Ford algorithm, etc., although aspects are not limited thereto.

Any one of the plurality of chiplets (e.g., the first chiplet 210) may be connected to an external device (e.g., a host 292) through a host interface. In this case, the other chiplets (e.g., the second chiplet 220, etc.) may be restricted from the communication with external device. The chiplet (e.g., the first chiplet 210) communicating with the external device may be referred to as a main chiplet, a primary die, a base chiplet, etc., and the other chiplets (e.g., the second chiplet 220) with restricted communication with the external device may be referred to as a sub-chiplet, a secondary die, a partner chiplet, etc. The host interface connecting the host 292 to the electronic device 200 or the main chiplet may include PCIe, etc.

The electronic device 200 including a plurality of chiplets, that is, the chiplet system may extend the functions of the host 292 (or the host system) (e.g., the host device 160 of FIG. 1) and process at least some functions in parallel. For example, the host 292 may manage the chiplet system and distribute tasks related to at least some functions to the chiplet system, and the chiplet system may process the distributed tasks in parallel. This enables to not only optimize and enhance the performance of the entire system including the host 292 and the chiplet system, but also provide a scalable computing environment. The chiplet system may perform functions of a multi-processor, a memory controller, a cache, a network interface, etc.

Figure 3:
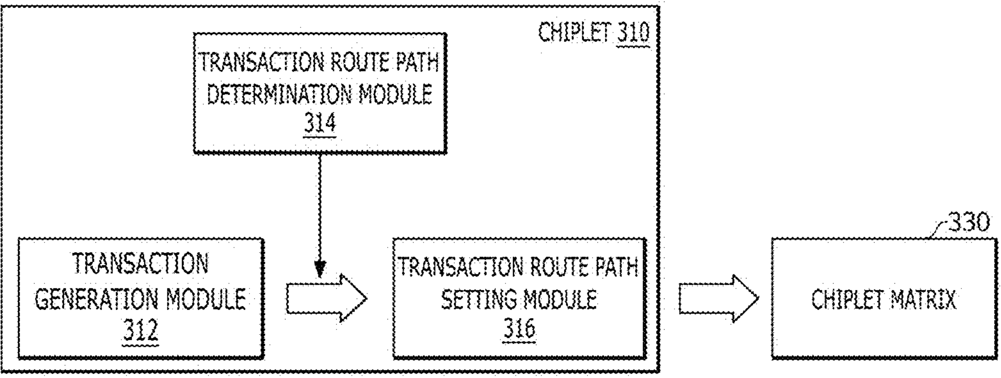
FIG. 3 is a diagram provided to explain a configuration of a chiplet associated with transmission of a transaction.

FIG. 3 is a diagram provided to explain a configuration of a chiplet 310 associated with transmission of a transaction. Referring to FIG. 3, the chiplet 310 (or source chiplet) (e.g., the chiplet 110 in FIG. 1) associated with transmission of a transaction may include a transaction generation module 312, a transaction route path determination module 314, and a transaction route path setting module 316. Note that this is based on the classification of the types of modules included in the chiplet 310 according to their functions, but the type and number of modules are not limited thereto.

The transaction generation module 312 may generate a transaction. For example, the transaction generation module 312 may generate a transaction in response to receiving a command for transaction transmission from a host device outside the chiplet 310 (e.g., the host device 160 in FIG. 1) or a host IP inside the chiplet 310.

The transaction route path determination module 314 may determine a route path for the transaction. The transaction route path determination module 314 may determine the route path for the transaction based on the number of transactions associated with each of a plurality of configurable route paths. For example, if a plurality of configurable route paths include a first route path and a second route path, the transaction route path determination module 314 may determine the route path for the transaction based on the number of transactions associated with the first route path and the number of transactions associated with the second route path. The number of transactions associated with the route path for the transaction may correspond to the number of MOs of a port associated with the communication module of the chiplet 310 for connection with the chiplet in the corresponding route path, among the chiplets adjacent to the chiplet 310. For example, the transaction route path determination module 314 may determine the route path for the transaction such that the transaction is transmitted to a port with a small number of MOs.

The transaction route path determination module 314 may determine, through a first function module that generates an instruction associated with the transmission of a transaction or controls the transmission of a transaction based on a received instruction, the route path for the transaction based on the number and size of transactions associated with each of the plurality of configurable route paths. For example, if a plurality of configurable route paths include a first route path and a second route path, the first function module may determine the route path for the transaction based on the number and size of transactions associated with the first route path and the number and size of transactions associated with the second route path. The first function module that generates the instruction associated with the transmission of a transaction or controls the transmission of a transaction based on a received instruction may be a software-based module, and may include a compiler or a program previously inputted to the host IP, for example. The first function module may be an upper level module of a second function module (e.g., the transaction generation module 312) that generates a transaction. Accordingly, the first function module may determine the route path for the transaction in consideration of the expected transaction congestion situation through transaction monitoring. The first function module may know in advance the number of transactions and the size of each of the transactions, and may determine (and modify) the route path for the transaction such that the transactions can be appropriately distributed to each of a plurality of configurable route paths. For example, the first function module may set the route path for the transaction such that the total size of the transaction transmitted to each of the route paths is the same.

The transaction route path determination module 314 may be a monitoring module that detects a congestion state of an interface for data transmission. In this case, the transaction route path determination module 314 may determine the route path for the transaction based on the congestion state of the interface. For example, the monitoring module may determine the route path for the transaction based on the congestion state of at least one of the interfaces (e.g., die-to-die interfaces) for data transmission between a plurality of chiplets or the interfaces (e.g., bus interfaces) for data transmission in the relay chiplet and destination chiplet. The monitoring module may be present in all chiplets or may be present in only one chiplet (e.g., only in the source chiplet). In addition, the monitoring module may be connected to the relay chiplet and the destination chiplet, and receive congestion information associated with the interface for data transmission from each of the connected chiplets. The monitoring module may determine the route path for the transaction such that the transaction is transmitted through an interface with low congestion.

The transaction route path setting module 316 may set, in the transaction, the determined route path for the transaction. For example, the transaction route path setting module 316 may include, in the transaction, information on the determined route path for the transaction.

The transaction route path setting module 316 may include, in the transaction, information on a preferred direction among directions in which the relay chiplets are positioned. For example, the transaction route path setting module 316 may allocate information on the preferred direction to any bit in the transaction. For example, the transaction route path setting module 316 may set the vertical flag or the horizontal flag in a part of the address bit, user bit, or control bit of the transaction.

The transaction route path setting module 316 may include, in the transaction, information on a preferred direction among the directions in which the relay chiplets are positioned, and information on the number of relay chiplets in the preferred direction. For example, the transaction route path setting module 316 may allocate, in any bit in the transaction, the information on the preferred direction and the information on the number of relay chiplets. For example, the transaction route path setting module 316 may set a vertical/horizontal flag and a hop counter in a part of the bits of the transaction.

The transaction route path setting module 316 may include, in the transaction, an encoding code associated with one of a plurality of configurable route paths. For example, the transaction route path setting module 316 may include, in any bit in the transaction, an encoding code corresponding to a route path for transaction that is determined from among a plurality of configurable route paths. The encoding code corresponding to each of a plurality of configurable route paths may be previously stored in an internal memory of the chiplet 310.

If a route path is set in the transaction, the chiplet 310 may transmit the transaction set with the route path to a chiplet matrix 330. The chiplet matrix 330 may refer to a chiplet connection structure in which a plurality of chiplets are connected in any manner. For example, the chiplet matrix 330 may include a destination chiplet to receive the transmitted transaction, and at least one relay chiplet where the transaction passes along.

In the present disclosure, it is described that a transaction is transmitted from a source chiplet to a destination chiplet, but this is only for the example of the request transaction, and aspects are not limited thereto. For example, a response transaction to a request transaction may be transmitted in the reverse direction, that is, from the destination chiplet (this may be the source chiplet in the case of the response transaction) to the source chiplet (this may be the destination chiplet in the case of the response transaction), and the method for transmitting the transaction described herein may also be applicable in this case.

In addition, because the method for transmitting the transaction according to an aspect of the present disclosure may be performed based on the hardware or software determination in a master IP (or source chiplet), it may be easier to overcome the limitation of the bandwidth of the die-to-die interface connecting the chiplets. Accordingly, it is desirable that the method for transmitting the transaction is applied to the structure of the electronic device including a plurality of chiplets.

Figure 4:
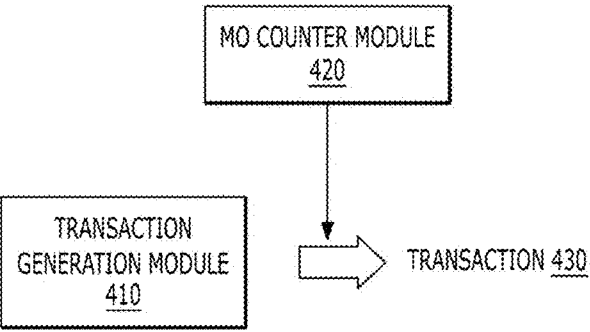
FIG. 4 is a diagram provided to explain a method for determining a route path for a transaction based on the number of transactions allocated to a port associated with a communication module.

FIG. 4 is a diagram provided to explain a method for determining a route path for a transaction based on the number of transactions allocated to a port associated with a communication module, and FIG. 5 is a diagram provided to explain an example of determining a route path for a transaction based on the number of transactions allocated to a port associated with a communication module. Referring to FIGS. 4 and 5, a transaction generation module 410 (e.g., the transaction generation module 312 of FIG. 3) of the source chiplet may generate a transaction 430. In addition, the transaction route path determination module of the source chiplet (e.g., the transaction route path determination module 314 in FIG. 3) may determine the route path for the transaction. The transaction route path determination module may include an MO counter module 420.

The MO counter module 420 may determine the route path for the transaction based on the number of transactions associated with each of a plurality of configurable route paths. The number of transactions associated with the route path for the transaction may correspond to the number of MOs of a port associated with the communication module of the source chiplet for connection with the relay chiplet in the corresponding route path, among the relay chiplets adjacent to the source chiplet. For example, the number of MOs may increase when the transaction is transmitted and decrease when a response to the transaction is received, and the MO counter module 420 may count the number of MOs for each of a plurality of configurable route paths and determine the route path with the least current number of MOs as the route path for the transaction.

Referring to FIG. 5, at a first time T0, ten (10) transactions are generated in each of the first route path and the second route path, thus indicating a state in which both the number of MOs corresponding to the first route path and the number of MOs corresponding to the second route path are 10. At the second time T1, responses to two of the transactions transmitted to the first route path return, indicating a state in which the number of MOs corresponding to the first route path is 8 (10 minus 2). In this case, the MO counter module 420 may set the first route path having the least number of MOs as the route path for the new transaction. Accordingly, at the third time T2, a new transaction is allocated and transmitted to the first route path, indicating a state in which the number of MOs corresponding to the first route path is 9. In addition, at a fourth time T3, new three transactions are allocated and transmitted to the first route path with the least number of MOs, indicating a state in which the number of MOs corresponding to the first route path is 12. Again, in this case, the MO counter module 420 may set the second route path having the least number of MOs as the route path for the new transaction. Accordingly, at the fifth time T4, two new transactions are allocated and transmitted to the second route path with the least number of MOs, indicating a state in which the number of MOs corresponding to the second route path is 12.

Figure 6:
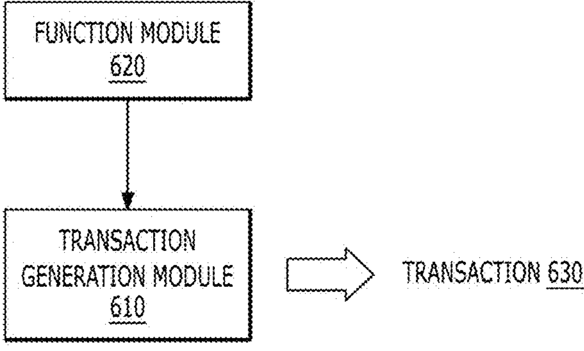
FIG. 6 is a diagram provided to explain a method for determining a route path for a transaction through a function module that controls transmission of a transaction based on an instruction associated with the transmission of a transaction.

FIG. 6 is a diagram provided to explain a method for determining a route path for a transaction through a function module 620 that controls transmission of a transaction based on an instruction associated with the transmission of a transaction. Referring to FIG. 6, a transaction generation module 610 (e.g., the transaction generation module 312 in FIG. 3) of the source chiplet may generate a transaction 630. In addition, the transaction route path determination module of the source chiplet (e.g., the transaction route path determination module 314 in FIG. 3) may determine the route path for the transaction. The transaction route path determination module may include the function module 620.

The function module 620 may generate an instruction associated with the transmission of the transaction, or control the transmission of the transaction based on a received instruction. The function module 620 may be a software-based module. For example, the function module 620 may include a compiler or a program previously input to the host IP. The function module 620 may be an upper level module of the transaction generation module 610 that generates a transaction. Accordingly, the function module 620 may determine the route path for the transaction in consideration of the expected transaction congestion situation through transaction monitoring. For example, the function module 620 may know in advance the number of transactions and the size of each of the transactions, and may determine (and modify) the route path for the transaction such that the transactions can be appropriately distributed to each of a plurality of configurable route paths. For example, if all the transactions transmitted from the source chiplet to the destination chiplet have the same size, the function module 620 may determine the route path for the transaction such that the same number of transactions are allocated to each of the available route paths. As another example, if at least some of the transactions transmitted from the source chiplet to the destination chiplet have different sizes, the function module 620 may determine the route path for the transaction such that the total size of the transactions allocated to each of the available route paths is the same.

Figure 7:
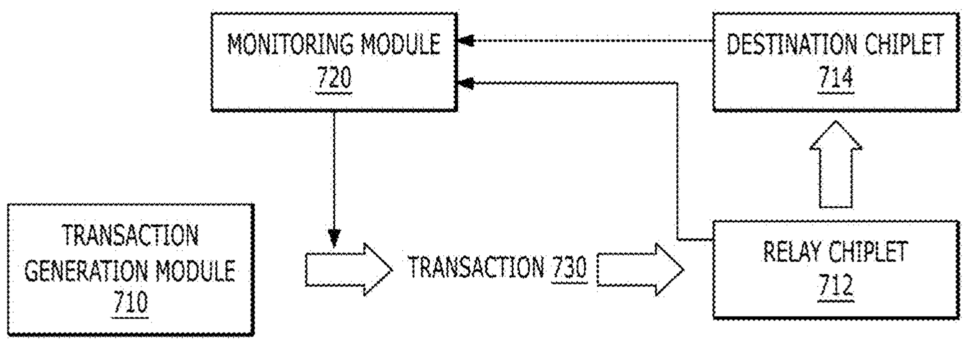
FIG. 7 is a diagram provided to explain a method for determining a route path for a transaction through a monitoring module that detects a congestion state of an interface for data transmission.

FIG. 7 is a diagram provided to explain a method for determining a route path for a transaction through a monitoring module 720 that detects a congestion state of an interface for data transmission. Referring to FIG. 7, a transaction generation module 710 (e.g., the transaction generation module 312 in FIG. 3) of the source chiplet may generate a transaction 730. In addition, the transaction route path determination module of the source chiplet (e.g., the transaction route path determination module 314 in FIG. 3) may determine the route path for the transaction. The transaction route path determination module may include the monitoring module 720.

The monitoring module 720 may detect a congestion state of an interface for data transmission. For example, the monitoring module 720 may detect a congestion state of at least one of an interface (e.g., a die-to-die interface) for data transmission between a plurality of chiplets or an interface (e.g., a bus interface) for data transmission in a relay chiplet 712 and a destination chiplet 714. In addition, the monitoring module 720 may determine the route path for the transaction based on the congestion state of the interface for data transmission. For example, the monitoring module 720 may determine a route path for a transaction based on the congestion state of at least one of the die-to-die interfaces between the plurality of chiplets, or the bus interface in the relay chiplet 712 and the destination chiplet 714.

The congestion state of the interface for data transmission may be continuously updated (or monitored). For example, the monitoring module 720 may be connected to the relay chiplet 712 (or the monitoring module of the relay chiplet) and the destination chiplet 714 (or the monitoring module of the destination chiplet), and receive congestion information associated with the interface for data transmission from each of the connected relay chiplet 712 and the destination chiplet 714. The monitoring module 720 may determine a route path for the transaction such that the transaction is transmitted through an interface with low congestion level.

Figure 8:
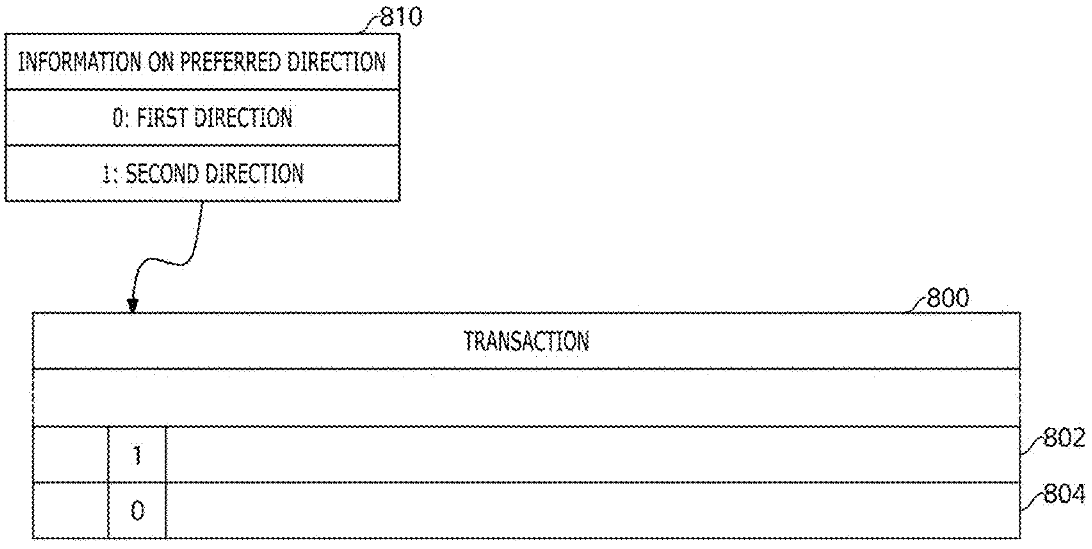
FIG. 8 is a diagram provided to explain a method of including, in a transaction, the information on the route path for the transaction, which may be information on a preferred direction.

FIG. 8 is a diagram provided to explain a method of including, in a transaction 800, the information on the route path for the transaction, which may be information 810 on a preferred direction, and FIG. 9 is a diagram provided to explain an example of transmitting a transaction based on the information on the preferred direction. Referring to FIGS. 8 and 9, the source chiplet (e.g., the chiplet 310 of FIG. 3) may include, in the transaction 800, information on the determined route path for the transaction. For example, the source chiplet may set, in the transaction 800, the determined route path for the transaction.

The source chiplet may include, in the transaction 800, the information 810 on the preferred direction. The information 810 on the preferred direction may include information on a direction through which the transaction 800 is preferentially routed, of the directions in which the chiplets are positioned and through which the transaction 800 can be routed. For example, if there are a first relay chiplet connected to the first direction (or the longitudinal direction or the vertical direction) (e.g., the first direction 102 of FIG. 1) of the source chiplet, and a second relay chiplet connected to the second direction (or the transversal direction or the horizontal direction) (e.g., the second direction 104 of FIG. 1) of the source chiplet, the information 810 on the preferred direction may include information that the first direction is the preferred direction or information that the second direction is the preferred direction.

The source chiplet may allocate the information 810 on the preferred direction to any bit in the transaction 800. For example, the source chiplet may allocate the information 810 on the preferred direction to a part of the address bit, user bit, or control bit of the transaction 800. In this case, the information 810 on the preferred direction may include a flag bit, as illustrated in FIG. 8. For example, if the information 810 on the preferred direction includes the information that the first direction is the preferred direction, a vertical flag "0" may be allocated to any bit in the transaction 800, and if the information 810 on the preferred direction includes the information that the second direction is the preferred direction, a horizontal flag "1" may be allocated to any bit in the transaction 800.

As described above, if the flag bit is set, the source chiplet may check the flag bit set in the transaction 800 and transmit the transaction to the adjacent chiplet according to the checked flag bit. Referring to FIGS. 8 and 9, in a first structure 910 including four chiplets (e.g., a first chiplet, a second chiplet, a third chiplet, and a fourth chiplet), if the horizontal flag "1" is set in a first transaction 802, the route path for the first transaction 802 may be determined to be a second route path 914 that starts from the first chiplet, preferentially passes through the third chiplet in the horizontal direction, and arrives at the fourth chiplet. In addition, in a second structure 920 including six chiplets (e.g., first, second, third, fourth, fifth, and sixth chiplets), it may be determined to be a fourth route path 924 that starts from the first chiplet, preferentially passes through the third chiplet in the horizontal direction, continues through the fifth chiplet in the horizontal direction, and arrives at the sixth chiplet.

In another example, in the first structure 910 including four chiplets, if a vertical flag ("0") is set in a second transaction 804, the route path for the second transaction 804 may be determined to be a first route path 912 that starts from the first chiplet, preferentially passes through the second chiplet in the vertical direction, and arrives at the fourth chiplet. In addition, in the second structure 920 including six chiplets, a third route path 922 may be determined, which starts from the first chiplet, passes through the second chiplet in the vertical direction, and because there is no chiplet remaining in the vertical direction, passes through the fourth chiplet in the horizontal direction, and arrives at the sixth chiplet.

Figure 10:
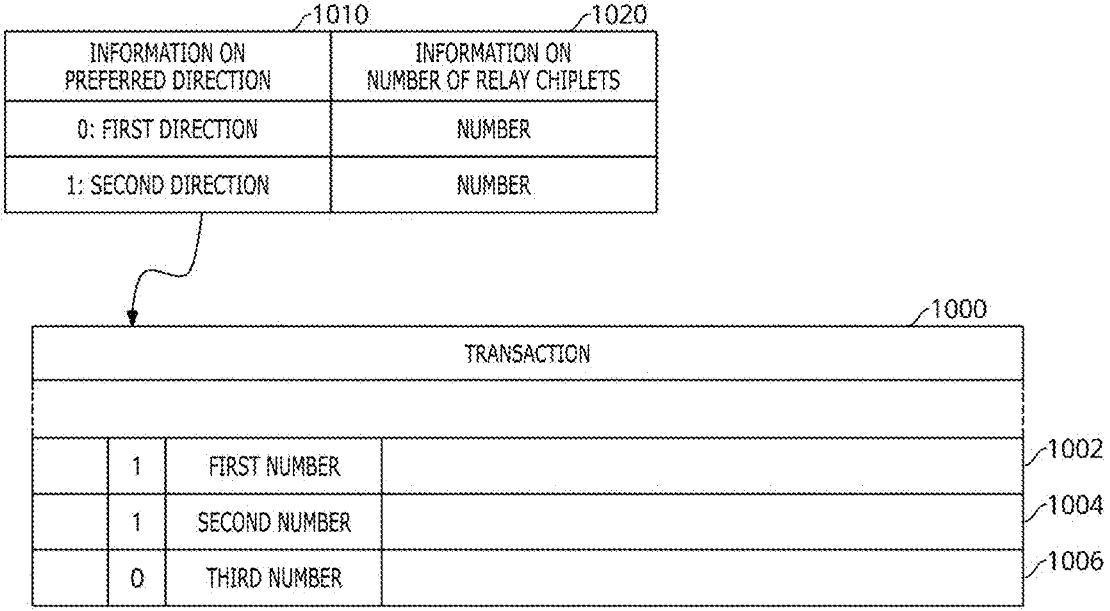
FIG. 10 is a diagram provided to explain a method of including, in a transaction, the information on the route path for the transaction, which may be information on a preferred direction and information on the number of relay chiplets.
Figure 11:
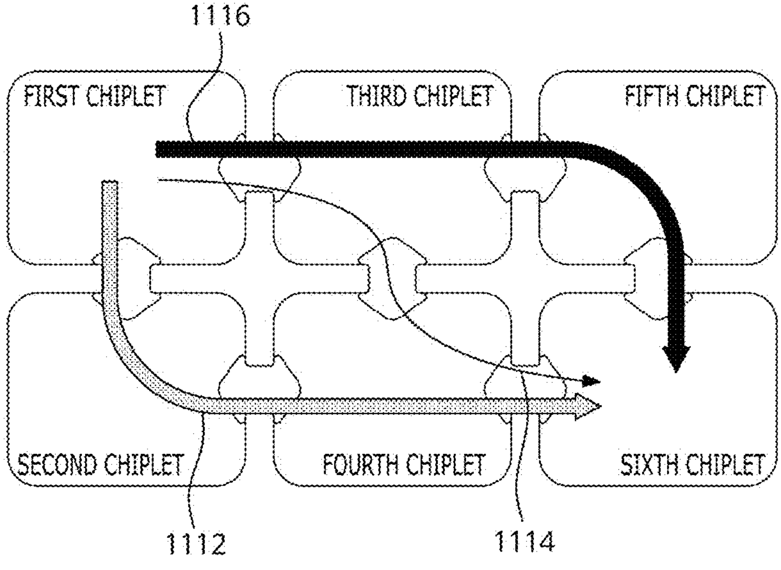
FIG. 11 is a diagram illustrating an example of transmitting a transaction based on the information on the preferred direction and the information on the number of relay chiplets to pass in the preferred direction.

FIG. 10 is a diagram provided to explain a method of including, in a transaction 1000, the information on the route path for the transaction, which may be information 1010 on a preferred direction and information 1020 on the number of relay chiplets, and FIG. 11 is a diagram illustrating an example of transmitting a transaction based on the information on the preferred direction and the information on the number of relay chiplets to pass in the preferred direction. Referring to FIGS. 10 and 11, the source chiplet (e.g., the chiplet 310 of FIG. 3) may include, in the transaction 1000, information on the determined route path for the transaction. For example, the source chiplet may set, in the transaction 1000, the determined route path for the transaction.

The source chiplet may include, in the transaction 1000, the information 1010 on the preferred direction and the information 1020 on the number of relay chiplets. The information 1010 on the preferred direction may be the same as or similar to the information 810 on the preferred direction of FIG. 8. Accordingly, this will not be described in further detail. In addition, the information 1020 on the number of the relay chiplets may refer to information on number of chiplets to pass in the preferred direction.

The source chiplet may allocate the information 1010 on the preferred direction and the information 1020 on the number of relay chiplets to any bit in the transaction 1000. For example, the source chiplet may allocate the information 1010 on the preferred direction and the information 1020 on the number of relay chiplets to part of the address bit, user bit, or control bit of the transaction 1000. The information 1020 on the number of relay chiplets may be referred to as a hop counter.

As described above, if the information 1010 on the preferred direction and the information 1020 on the number of relay chiplets are set, the source chiplet may check the information 1010 on the preferred direction and the information 1020 on the number of relay chiplets set in the transaction 1000, and transmit the transaction to the adjacent chiplet according to the checked information 1010 on the preferred direction and information 1020 on the number of relay chiplets. Referring to FIGS. 10 and 11, in a structure including six chiplets (e.g., first, second, third, fourth, fifth, and sixth chiplets), if the horizontal flag is set in a first transaction 1002 and the hop counter is set to a first number (e.g., "1"), a second route path 1114 may be determined for the route path for the first transaction 1002, which starts from the first chiplet, proceeds preferentially in the horizontal direction, but passes one third chiplet in the horizontal direction because the hop counter is 1, then passes through a fourth chiplet in the vertical direction, and arrives at a sixth chiplet.

In another example, in a structure including six chiplets, if the horizontal flag is set in a second transaction 1004 and the hop counter is set to a second number (e.g., "2"), a third route path 1116 may be determined for the route path for the second transaction 1004, which starts from the first chiplet, proceeds preferentially in the horizontal direction, but passes through two, that is, the third and fifth chiplets in the horizontal direction because the hop counter is 2, and arrives at the sixth chiplet. In another example, in a structure that includes six chiplets, if a vertical flag is set in a third transaction 1006 and the hop counter is set to a third number (e.g., "1"), a first route path 1112 may be determined for the route path for the third transaction 1006, which starts from the first chiplet, proceeds preferentially in the vertical direction, but passes through one second chiplet in the vertical direction because the hop counter is 1, then passes through the fourth chiplet in the horizontal direction, and arrives at the sixth chiplet.

Figure 13:
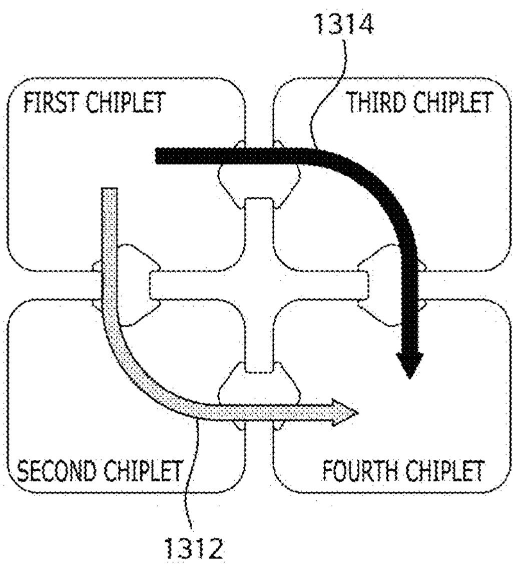
FIG. 13 is a diagram provided to explain an example of transmitting a transaction based on the encoding code.

FIG. 12 is a diagram provided to explain a method of including, in a transaction, an encoding code associated with a route path for a transaction, and FIG. 13 is a diagram provided to explain an example of transmitting a transaction based on the encoding code. Referring to FIGS. 12 and 13, the source chiplet (e.g., the chiplet 310 of FIG. 3) may include, in the transaction, information on the determined route path for the transaction. For example, the source chiplet may set, in the transaction, the determined route path for the transaction.

The source chiplet may include, in the transaction, an encoding code associated with one of a plurality of configurable route paths. For example, the source chiplet may include, in any bit in the transaction, an encoding code corresponding to the determined route path for the transaction, of a plurality of configurable route paths. The table illustrated in FIG. 12 shows a state in which the source chiplet is encoded in the address bit of the transaction. The encoding code corresponding to each of a plurality of configurable route paths may be previously stored in a memory in the source chiplet.

Referring to FIGS. 12 and 13, if a first encoding code (e.g., "0x011") is included in any bit (e.g., an address bit) of a first transaction 1210, the route path for the first transaction 1210 may be determined as a first route path 1312 that starts from the first chiplet, passes through the second chiplet, and arrives at the fourth chiplet. In addition, if a second encoding code (e.g., "0x100") is included in any bit (e.g., address bit) of a second transaction 1220, the route path for the second transaction 1220 may be determined as a second route path 1314 that starts from the first chiplet, passes through the third chiplet, and arrives at the fourth chiplet.

Figure 14:
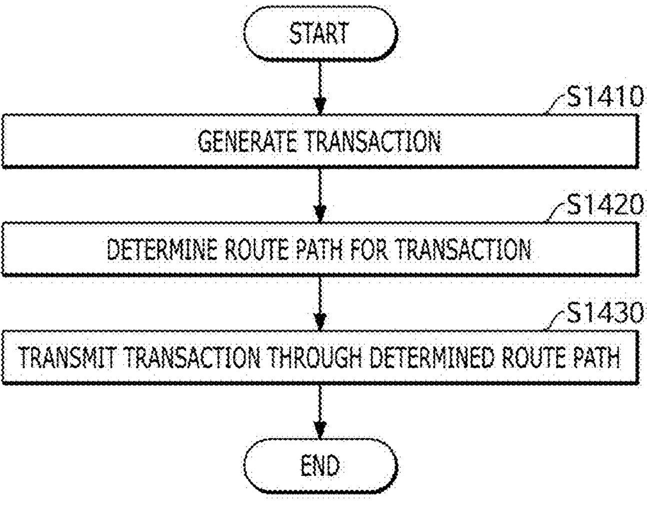
FIG. 14 is a diagram provided to explain a method for transmitting a transaction of an electronic device including a plurality of chiplets.

FIG. 14 is a diagram provided to explain a method for transmitting a transaction of an electronic device including a plurality of chiplets. Referring to FIG. 14, the first chiplet (or source chiplet) (e.g., the first chiplet 110 of FIG. 1, the first chiplet 210 of FIG. 2, or the chiplet 310 of FIG. 3) of the electronic device (e.g., the electronic device 100 of FIG. 1 or the electronic device 200 of FIG. 2) including a plurality of chiplets may generate a transaction, at S1410. For example, the first chiplet may generate a transaction in response to receiving a command for transaction transmission from a host device outside the first chiplet (e.g., the host device 160 in FIG. 1) or a host IP inside the first chiplet.

At S1420, the first chiplet may determine a route path for the transaction. For example, the first chiplet may determine the route path for the transaction that includes at least one third chiplet (or relay chiplet) (e.g., the second chiplet 120 or the third chiplet 130 of FIG. 1, the second chiplet 220, the third chiplet 230, the fourth chiplet 240, the fifth chiplet 250, the sixth chiplet 260, the seventh chiplet 270, or the eighth chiplet 280 of FIG. 2).

The first chiplet may determine the route path for the transaction based on the number of transactions associated with each of a plurality of configurable route paths. The number of transactions associated with the route path for the transaction may correspond to the number of MOs of a port associated with the communication module of the first chiplet for connection with the third chiplet in the corresponding route path, among the third chiplets adjacent to the first chiplet. For example, the first chiplet may determine the route path for the transaction such that the transaction is transmitted to a port with a small number of MOs.

The first chiplet may determine, through a first function module (e.g., the function module 620 of FIG. 6) that generates an instruction associated with the transmission of a transaction or controls the transmission of a transaction based on a received instruction, the route path for the transaction based on the number and size of transactions associated with each of a plurality of configurable route paths. The first function module that generates the instruction associated with the transmission of a transaction or controls the transmission of a transaction based on a received instruction may be a software-based module, and may include a compiler or a program previously inputted to the host IP, for example. The first function module may be an upper level module of the second function module that generates a transaction (e.g., the transaction generation module 312 of FIG. 3 or the transaction generation module 610 of FIG. 6). Accordingly, the first function module may determine the route path for the transaction in consideration of the expected transaction congestion situation through transaction monitoring. The first function module may know in advance the number of transactions and the size of each of the transactions, and may determine (and modify) the route path for the transaction such that the transactions can be appropriately distributed to each of a plurality of configurable route paths. For example, the first function module may set the route path for the transaction such that the total size of the transaction transmitted to each of the route paths is the same.

The first chiplet may determine, through a monitoring module (e.g., the monitoring module 720 in FIG. 7) that detects the congestion state of the interface for data transmission, the route path for the transaction based on the congestion state of the interface. For example, the monitoring module may determine the route path for the transaction based on the congestion state of at least one of an interface (e.g., a die-to-die interface) for data transmission between a plurality of chiplets, or an interface (e.g., bus interface) for data transmission in a third chiplet as a relay chiplet and a second chiplet as a destination chiplet (e.g., the fourth chiplet 140 in FIG. 1 or the ninth chiplet 290 in FIG. 2). In addition, the monitoring module may be connected to the third chiplet and the second chiplet, and may receive congestion information associated with the interface for data transmission from each of the connected chiplets. The monitoring module may determine the route path for the transaction such that the transaction is transmitted through an interface with low congestion.

After S1420, the first chiplet may set, in the transaction, the determined route path for the transaction. For example, the first chiplet may include, in the transaction, information on the determined route path for the transaction.

The first chiplet may include, in the transaction, information on a preferred direction among the directions in which the chiplets are positioned. For example, the first chiplet may allocate, to any bit in the transaction, information on the preferred direction. For example, the first chiplet may set the vertical flag or horizontal flag in a part of the address bit, user bit, or control bit of the transaction.

The first chiplet may include, in the transaction, the information on the preferred direction among the directions in which the relay chiplets are positioned and information on the number of relay chiplets in the preferred direction. For example, the first chiplet may allocate, to any bit in the transaction, the information on a preferred direction and the information on the number of relay chiplets. For example, the first chiplet may set a vertical/horizontal flag and a hop counter in a part of the bit of the transaction.

The first chiplet may include, in the transaction, an encoding code associated with one of a plurality of configurable route paths. For example, the first chiplet may include, in any bit in the transaction, an encoding code corresponding to the determined route path for the transaction, of a plurality of configurable route paths.

At S1430, the first chiplet may transmit the transaction to the second chiplet through the determined route path for the transaction. Accordingly, the second chiplet may receive the transaction.

The method for transmitting the transaction may be applied in the same or similar manner when the second chiplet receiving the transaction transmits a response to the transaction to the first chiplet, which is the source chiplet from which the transaction was transmitted. For example, the second chiplet may generate a transaction (e.g., a response transaction). In addition, the second chiplet may determine a route path for the generated transaction. The second chiplet may transmit the transaction to the first chiplet through the determined route path for the transaction. Alternatively, the second chiplet receiving the transaction may transmit the response transaction to the first chiplet along the same path as it received the transaction.

The flowchart and description above are merely examples and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. An electronic device comprising a plurality of chiplets arranged in a chiplet matrix, comprising:

a first chiplet that generates a transaction;

a second chiplet that receives the transaction; and a third chiplet and a fourth chiplet that are capable of relaying the transaction, wherein the first chiplet determines a route path for the transaction between a first route path and a second route path, and transmits the transaction through the determined first route path or second route path for the transaction, the third chiplet is connected to the first chiplet through a first communication module in a first direction of the first chiplet, the fourth chiplet is connected to the first chiplet through a second communication module in a second direction of the first chiplet, the first route path passes through the third chiplet and the second route path passes through the fourth chiplet, the first chiplet receives monitored congestion state information from the first communication module and the second communication module, the first chiplet determines the route path for the transaction based on receiving the monitored congestion state information of the first communication module and the second communication module, the congestion state information including a number of transactions associated with the first route path and a number of transactions associated with the second route path, and the first chiplet determines, as the route path for the transaction, one of the first route path or the second route path based on the monitored congestion state information.

2. The electronic device according to claim 1, wherein the number of transactions associated with the first route path corresponds to a number of multiple outstandings (MOs) of a first port associated with the first communication module, and the number of transactions associated with the second route path corresponds to a number of MOs of a second port associated with the second communication module.

3. The electronic device according to claim 1, wherein the first chiplet includes a first function module that generates an instruction associated with the transmission of the transaction or controls the transmission of the transaction based on a received instruction, and the first function module is configured to determine the route path for the transaction based on the number and size of the transactions associated with the first route path and the number and size of the transactions associated with the second route path.

4. The electronic device according to claim 3, wherein the first chiplet further includes a second function module that generates the transaction, the first function module is an upper level module of the second function module, the first function module determines the route path for the transaction in consideration of an expected transaction congestion situation, and the first function module modifies the route path for the transaction generated by the second function module according to the determined route path for the transaction.

5. The electronic device according to claim 1, wherein the first chiplet includes a monitoring module that detects the congestion state of at least one of a first interface for data transmission between the plurality of chiplets, or a second interface for data transmission in the second chiplet, the third chiplet, and the fourth chiplet, and the monitoring module is configured to determine the route path for the transaction based on the congestion state of at least one of the first interface or the second interface.

6. The electronic device according to claim 5, wherein the monitoring module is connected to the second chiplet, the third chiplet, and the fourth chiplet, and the monitoring module receives at least one of congestion information associated with the first interface or congestion information associated with the second interface from each of the second chiplet, the third chiplet, and the fourth chiplet.

7. The electronic device according to claim 5, wherein the monitoring module receives at least one of congestion information associated with the first interface or congestion information associated with the second interface, from another chiplet through a third interface different from the first interface.

8. The electronic device according to claim 1, wherein the first chiplet includes, in the transaction, information on the determined first route path or second route path for the transaction.

9. An electronic device comprising a plurality of chiplets arranged in a chiplet matrix, comprising:

a first chiplet that generates a transaction;

a second chiplet that receives the transaction; and a third chiplet and a fourth chiplet that are capable of relaying the transaction, wherein the first chiplet receives monitored congestion state information from the first communication module and the second communication module, the first chiplet determines a route path for the transaction between a first route path and a second route path based on receiving the monitored congestion state information of a first communication module and a second communication, the congestion state information including a number of transactions associated with the first route path and a number of transactions associated with the second route path, and transmits the transaction through the determined first route path or the second route path for the transaction, the third chiplet is connected to the first chiplet through a first communication module in a first direction of the first chiplet, the fourth chiplet is connected to the first chiplet through a second communication module in a second direction of the first chiplet, the first route path passes through the third chiplet and the second route path passes through the fourth chiplet, the first chiplet includes, in the transaction, information on the determined first route path or second route path for the transaction, and the information on the determined route path for the transaction includes information on a preferred direction between the first direction or the second direction.

10. The electronic device according to claim 9, wherein the information on the determined first route path or second route path for the transaction further includes information on a number of relay chiplets in the preferred direction.

11. The electronic device according to claim 9, wherein the information on the determined first route path or second route path for the transaction includes an encoding code associated with one of a plurality of route paths that can be set between the plurality of chiplets.

12. A method for transmitting a transaction of an electronic device including a plurality of chiplets arranged in a chiplet matrix, the method comprising:

generating, by a first chiplet, a transaction;

determining, by the first chiplet, between a first route path and a second route path for the transaction that passes through a third chiplet or a fourth chiplet;

transmitting, by the first chiplet, the transaction to a second chiplet through the determined first route path or second route path for the transaction; and receiving, by the second chiplet, the transaction;

receiving, by the first chiplet, monitored congestion state information from the first communication module and the second communication module, wherein the third chiplet is connected to the first chiplet through a first communication module in a first direction of the first chiplet, the fourth chiplet is connected to the first chiplet through a second communication module in a second direction of the first chiplet, the first route path passes through the third chiplet and the second route path passes through the fourth chiplet, and the determining the route path for the transaction based on receiving the monitored congestion state information of the first communication module and the second communication module, the congestion state information includes a number of transactions associated with the first route path and a number of transactions associated with the second route path, wherein the determining the route path includes determining one of the first route path or the second route path based on the monitored congestion state information.

13. The method according to claim 12, wherein the first chiplet includes a function module that generates an instruction associated with the transmission of the transaction or controls the transmission of the transaction based on a received instruction, and the determining the route path for the transaction includes determining, by the function module, the route path for the transaction based on the number and size of transactions associated with the first route path and the number and size of transactions associated with the second route path.

14. The method according to claim 12, wherein the first chiplet includes a monitoring module that detects a congestion state of at least one of a first interface for data transmission between the plurality of chiplets, or a second interface for data transmission in the second chiplet, the third chiplet, and the fourth chiplet, and the determining the route path for the transaction includes determining, by the monitoring module, the route path for the transaction based on the congestion state of at least one of the first interface or the second interface.

15. The method according to claim 12, further comprising including, in the transaction, information on the determined route path for the transaction.

16. The method according to claim 15, wherein the information on the determined route path for the transaction includes information on a preferred direction between the first direction or the second direction.

* * * * *